United States Patent
Helmsen et al.

(10) Patent No.: US 10,469,515 B2
(45) Date of Patent: Nov. 5, 2019

(54) METHODS AND APPARATUS FOR EFFICIENT STORAGE AND PROCESSING OF GLOBAL AND LOCAL CYBER THREAT DATA IN A DISTRIBUTED FACTOR GRAPH DATABASE

(71) Applicant: Lookingglass Cyber Solutions, Inc., Baltimore, MD (US)

(72) Inventors: John Joseph Helmsen, Rockville, MD (US); Bryan Wesley Brown, Baltimore, MD (US); Christopher Paul Pinney Wood, Centreville, VA (US); Allan Thomson, Pleasanton, CA (US)

(73) Assignee: Lookingglass Cyber Solutions, Inc., Reston, VA (US)

( * ) Notice: Subject to any disclaimer, the term of this patent is extended or adjusted under 35 U.S.C. 154(b) by 221 days.

(21) Appl. No.: 15/049,782

(22) Filed: Feb. 22, 2016

(65) Prior Publication Data
US 2017/0244742 A1 Aug. 24, 2017

(51) Int. Cl.
*H04L 29/06* (2006.01)
*H04L 12/24* (2006.01)

(52) U.S. Cl.
CPC ...... *H04L 63/1433* (2013.01); *H04L 63/1416* (2013.01); *H04L 41/12* (2013.01)

(58) Field of Classification Search
CPC . H04L 63/1433; H04L 63/1416; H04L 41/12; G06F 21/51; G06F 21/56
See application file for complete search history.

(56) References Cited

U.S. PATENT DOCUMENTS 8,874,685 B1 * 10/2014 Hollis .................... H04L 41/00
 709/206
9,118,714 B1 9/2015 Thomson et al.
2005/0149481 A1 * 7/2005 Hesselink ........... H04L 63/0209
(Continued)

FOREIGN PATENT DOCUMENTS

WO  WO 02/069186 A1  9/2002

OTHER PUBLICATIONS

Extended European Search Report for European Patent Application No. 17157429.6, dated Jul. 4, 2017.

*Primary Examiner* — Noura Zoubair
(74) *Attorney, Agent, or Firm* — Cooley LLP

(57) ABSTRACT

Apparatus and methods described herein relate to a global workspace management compute device that can generate a workspace hierarchy tree representing a hierarchy of a set of workspaces in a network. A local workspace management compute device operatively coupled to the global workspace management compute device can, when operative, calculate workspace cyber-threat data for a local workspace in the set of workspaces based on data from a global workspace, and can provide the calculated workspace cyber-threat data to a local workspace interface so that the local workspace interface displays a representation of the set of workspaces in the network. After receiving modifications of portions of the local workspace cyber-threat data, the local workspace management compute device can define a child node of the local workspace based on the modifications. The local workspace interface can modify the representation of the set of workspaces in the network based on the child node.

26 Claims, 11 Drawing Sheets

(56) References Cited

U.S. PATENT DOCUMENTS

| | | | | |
|---|---|---|---|---|
| 2011/0320394 A1* | 12/2011 | McKeown | ........ | G06F 17/30958 |
| | | | | 706/47 |
| 2014/0280362 A1* | 9/2014 | Henderson | ............ | G06F 16/273 |
| | | | | 707/798 |
| 2015/0371044 A1* | 12/2015 | Horne | ..................... | G06F 21/57 |
| | | | | 726/25 |
| 2016/0125093 A1* | 5/2016 | Cho | .................. | G06F 17/30958 |
| | | | | 707/798 |
| 2016/0212165 A1* | 7/2016 | Singla | ................... | G06F 21/577 |

* cited by examiner

METHODS AND APPARATUS FOR EFFICIENT STORAGE AND PROCESSING OF GLOBAL AND LOCAL CYBER THREAT DATA IN A DISTRIBUTED FACTOR GRAPH DATABASE

FIELD

The methods and apparatus described herein are generally related, for example, to improving the data storage and data processing efficiency of cybersecurity technologies.

BACKGROUND

In some known network systems, analysts can determine rules or risk values (e.g., cyber-threat values, and/or similar values) for devices in their portion of the network system. The rules and/or values determined by each analyst may depend on how other devices in the network are configured, values associated with the network as a whole, and/or other values. Such determinations, therefore, can involve transmission of large quantities of data, as some known network systems may send information about each device (e.g., network information, and/or threat intelligence information) to each analyst in the network. Additionally, in some known systems that only send a portion of a network's data to an analyst (e.g., to reduce the amount of information transmitted across the network), the analyst cannot view data from the rest of the network. The limited scope of information can affect the analysts' ability to calculate certain values (such as cyber-threat values and/or threat intelligence values), to predict changes in the network (e.g., with respect to network and/or cyber-threat changes), and/or to perform other actions within their portions of the network. Analysts in some known network systems also lack an efficient way to simultaneously process data received from a global representation of the network, and to reconcile those changes with other changes being made, substantially in real-time, to the global representation.

Accordingly, a need exists for methods and apparatus that efficiently provide information about the network (including network device and threat intelligence data) as a whole to each analyst in the network, and that efficiently allow analysts to process data about their portion of the network while reconciling their changes with other changes being made to the rest of the network.

SUMMARY

In some implementations, an apparatus can include a global workspace management compute device that is implemented in at least one of a processor or a memory, and that, when operative, can generate a workspace hierarchy tree that both represents a hierarchy of a set of workspaces in a network, and includes a global workspace. The apparatus can also include a local workspace management compute device operatively coupled to the global workspace management compute device. The local workspace management compute device, when operative, can calculate workspace cyber-threat data for a local workspace that is both from the set of workspaces and is instantiated at the local workspace management compute device. In some implementations, the local workspace cyber-threat data can be calculated based on global workspace cyber-threat data associated with the global workspace. The apparatus can also include a local workspace interface operatively coupled to the local workspace management compute device. The local workspace interface can, when operative, display a representation of the set of workspaces in the network, based on the local workspace cyber-threat data associated with the local workspace. The local workspace interface can also, when operative, receive input from a local workspace administrator that includes a modification to the local workspace cyber-threat data associated with the local workspace. The local workspace management compute device can, when operative, define a child node of the local workspace based on the modification to the local workspace cyber-threat data associated with the local workspace. The local workspace interface can, when operative, modify the representation of the set of workspaces in the network based on the child node.

In some implementations, an apparatus can include a global workspace management compute device implemented in at least one of a processor or a memory. The global workspace management compute device can, when operative, generate a workspace hierarchy tree that includes a global workspace. The apparatus can also include a local workspace management compute device operatively coupled to the global workspace management compute device, and that receives a request for workspace cyber-threat data for a local workspace from a set of workspaces. The local workspace management compute device can, when operative, determine the workspace cyber-threat data based on a first delta child node, and can send the workspace cyber-threat data in response to the request. The local workspace management compute device can, when operative, receive a global workspace modification message indicating that global workspace cyber-threat data associated with the global workspace has been modified, and can generate a second delta child node based on the global workspace modification message.

In some implementations, a process can include generating a global workspace factor graph representing a set of objects, such that each object from the set of objects includes representation of a hierarchy of a set of workspaces in a network, the set of objects including a first object and a second object. The process can also include generating a set of local workspace factor graphs, where each local workspace factor graph from the set of local workspace factor graphs is associated with an object of the set of objects and generated based on the global workspace factor graph. The process can also include substantially simultaneously distributing each local workspace factor graph from the set of local workspace factor graphs to a workspace analysis processor associated with the first object associated with the local workspace factor graph, and to a workspace analysis processor associated with the second object associated with the local workspace factor graph. The process can include substantially simultaneously receiving, at the first object and from the second object, global workspace factor graph modifications for the global workspace factor graph, and defining a child node associated with a workspace represented in the global workspace factor graph based on the global workspace factor graph modifications and so as to modify the global workspace factor graph. The process can include generating a set of modified local workspace factor graphs based on the modified global workspace factor graph, and distributing each modified local workspace factor graph from the set of modified local workspace factor graphs to the workspace analysis processor associated with the first object associated with the local workspace factor graph and to the workspace analysis processor associated with the second object associated with the local workspace factor graph.

DETAILED DESCRIPTION

Figure 1:
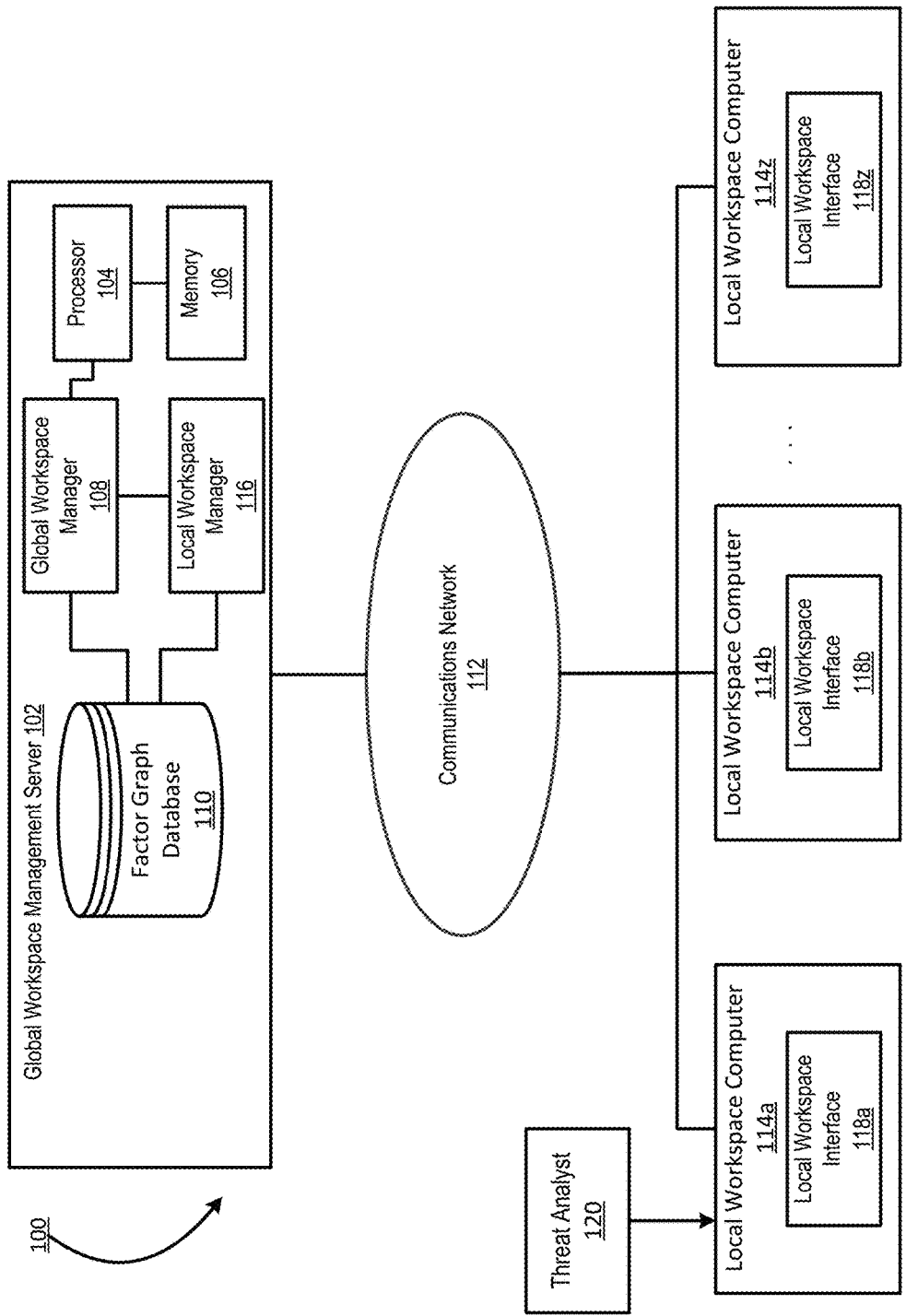
FIG. 1 is a schematic diagram illustrating a workspace network, according to an embodiment.

FIG. 1 is a schematic diagram illustrating a workspace network 100. For example, in some implementations, the workspace network 100 can include a global workspace management server 102. The global workspace management server 102 can include at least one processor 104, at least one memory 106, and/or at least one factor graph database 110. The at least one processor 104 can be any hardware module and/or component configured to receive and process data, and/or to execute code representing executable instructions. In some embodiments, the at least one processor 104 can be a general purpose processor, a Field Programmable Gate Array (FPGA), an Application Specific Integrated Circuit (ASIC), a Digital Signal Processor (DSP), and/or the like.

The at least one memory 106 can be a hardware module and/or component configured to store data accessible by the at least one processor 104, and/or to store code representing executable instructions for the at least one processor 104. The memory 106 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 106 stores instructions to cause the processor to execute modules, processes and/or functions associated with a global workspace management server 102 and/or system.

The at least one processor 104 can implement a number of modules, compute devices, and/or server components, including but not limited to a global workspace manager 108 and a local workspace manager 116. The at least one processor 104 can be configured to execute instructions generated by any of the modules and/or server components, and/or instructions stored in the memory 106. In some implementations, if the global workspace management server 102 includes multiple processors 104, the modules and/or server components can be distributed among and/or executed by the multiple processors. The at least one memory 106 can be configured to store processor-readable instructions that are accessible and executable by the processor 104.

In some implementations, the modules, compute devices, and/or server components can be implemented on the processor 104 (e.g., as software executed on and/or implemented by the processor). In some implementations, the modules, compute devices, and/or server components can be software stored in the memory 106 and executed by the processor 104. In other implementations, the modules, compute devices, and/or server components can be any assembly and/or set of operatively-coupled electrical components separate from the processor 104 and the memory, including but not limited to field programmable gate arrays (FPGAs) and/or application-specific integrated circuits (ASICs).

A global workspace manager 108 can be a module, compute device, and/or server component configured to manage the generation and modification of a global workspace hierarchy factor graph. For example, the global workspace manager 108 can use information about the workspace network 100 and a number of analysts 120 accessing the workspace network 100, to arrange a set of workspaces associated with the analysts 120 into a workspace hierarchy (e.g., represented in a factor graph and/or a similar representation). The workspace hierarchy can be used to determine how information is stored and/or propagated in the workspace network 100. The global workspace manager 108 can also manage modifications to data in the global workspace hierarchy factor graph, e.g., by applying the modification and propagating the effects of the modification throughout the global workspace hierarchy factor graph.

A local workspace manager 116 can be a module, compute device, and/or server component configured to manage the generation, propagation, and modification of local workspace hierarchy factor graphs. For example, the local workspace manager 116 can generate local workspace hierarchy factor graphs based on the global workspace hierarchy factor graph, can distribute the local workspace hierarchy factor graphs to local workspace computers 114a-z, and/or can process revisions made to each local workspace hierarchy factor graph at each local workspace computer 114a-z. Further examples may be found in FIGS. 6-10, described in further detail herein.

Figure 2:
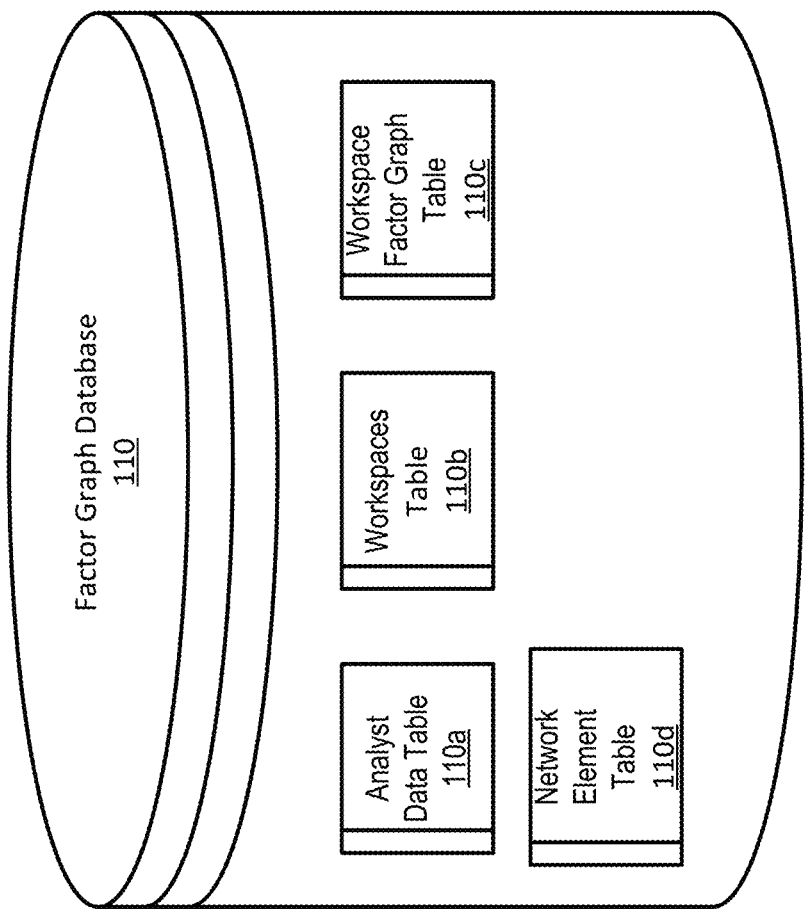
FIG. 2 is a schematic diagram illustrating a factor graph database, according to an embodiment.

The at least one factor graph database 110 can be a data store and/or memory configured to store multiple data records. Referring to FIG. 2, in some implementations, the factor graph database 110 can include an analyst data table 110a, a workspaces table 110b, a workspace factor graph table 110c, and/or a network element table 110d. Tables in the at least one factor graph database 110 can be distributed across multiple databases, or can be stored in one database.

For example, the analyst data table 110a can contain records relating to analysts 120 and/or other entities in the workspace network 100 and can receive and/or manage a local workspace hierarchy factor graph. In some instances, the term "analysts" can refer to computing devices (e.g., local workspace computer 114a-z), users operating local computing devices such as local workspace computers 114a-z, and/or the like. A record in an analyst data table 110a can include an identifier of the analyst 120 and/or other entity, identifying information associated with a local workspace computer 114a-z associated with the analyst 120, a local workspace associated with the analyst 120, a local workspace hierarchy factor graph associated with the analyst 120, a date at which the analyst 120 was added to the factor graph database 110, and/or other information relating to the threat analyst 120.

A workspaces table 110*b* can include information relating to analyst workspaces, and/or other workspaces included in a workspace factor graph. Workspaces can include data relating to a particular organization, a member of the organization, and/or other information, depending on the location of the workspace in a workspace hierarchy factor graph, and can also specify network elements and/or other network and/or threat information associated with a particular analyst 120, organization, and/or similar entity. A record in a workspaces table 110*b* can include a workspace identifier, a workspace scope (e.g., a global workspace and/or a local workspace), an identifier associated with an analyzer, an identifier of a global workspace hierarchy to which the workspace belongs, devices and/or other network elements associated with the workspace, a list of connections between various network elements associated with the workspace, threat information associated with the workspace, a set of scoring parameters associated with the workspace, a date indicating the last time the workspace data was updated and/or other information relating to a workspace. With respect to data relating to connections between network elements, threat information associated with the workspace, and/or scoring parameters associated with the workspace, the data stored in each workspace record can be different from data stored at a workspace record associated with a workspace higher in a workspace hierarchy, than a workspace associated with that workspace record. Further information relating to how data may be stored at a workspace can be found at least in FIGS. 3-10, described in more detail herein.

A workspace factor graph table 110*c* can include representations of local and global workspace hierarchy factor graphs for a network. A record in the workspace factor graph table 110*c* can include, for example, an identifier for a workspace hierarchy factor graph, a workspace hierarchy factor graphs type (e.g., global or local), an identifier of a network with which the workspace hierarchy factor graph is associated, a list of workspaces associated with the workspace hierarchy factor graphs, a hierarchy graph specifying the hierarchy of the list of workspaces, a list of identifiers associated with local workspace computers 114*a-z* and/or analysts 120 associated with the workspace hierarchy factor graph, a date indicating the last time the workspace hierarchy factor graph was updated, and/or other information relating to workspace hierarchy factor graphs.

A network element table 110*d* can include data relating to network elements and/or network objects associated with workspaces. A record in the network element table 110*d* can include a network element identifier, a network element type (e.g., a virtual network element, and/or a physical network element such as a network server, a computer and/or other electronic device connected to the workspace network 100, and/or the like), a list of connections between a network element represented by the network element record and other network elements in the workspace network 100, a workspace with which the network element and/or network object is associated, an analyst 120 with which the network element and/or network object is associated, a threat indicator confidence score associated with the network element and/or network object, and/or other information relating to network elements and/or network objects.

Returning to FIG. 1, a communications network 112 can be the Internet, and/or a similar wireless and/or wired network that enables the global workspace management server 102 to communicate with multiple local workspace computers 114*a-z*, and/or with other network devices. For example, the communications network 112 can be a telephone network, an Ethernet network, a fiber-optic network, a cellular network, and/or a similar wired and/or wireless network. In some implementations, the communications network 112 can include a single network to which a number of workspaces, network elements, and/or network objects can belong. In other implementations, the communications network 112 can include multiple networks operatively coupled to each other, e.g., via one or more routers, switches, and/or network gateways. Each of local workspace computers 114*a-z* can be a computing device including at least one of a processor and/or memory similar to those of the global workspace management server 102. The local workspace computers 114*a-z* can be configured to receive local workspace hierarchy factor graph information for a local workspace, and can process the information, and/or can display the information on at least one display operatively coupled to the local workspace computer 114*a-z*. For example, the local workspace computers 114*a-z* can each instantiate a local workspace interface 118*a-z*, which can render the local workspace hierarchy factor graph information at the respective local workspace computer 114*a-z*. The information displayed can be modified, e.g., when global workspace hierarchy factor graph information has been updated, when the local workspace hierarchy factor graph information has been updated, and/or under similar circumstances. Each local workspace computers 114*a-z* can be associated with a particular workspace stored in the factor graph database 110. For example, local workspace computers 114*a* can be associated with one or more particular workspaces in the global hierarchy factor graph, such that if a cyber-threat event involving the local workspace computers 114*a* occurs, the one or more workspaces in the global hierarchy factor graph can be updated to reflect the cyber-threat event. Local versions of the global workspace hierarchy factor graph can also be stored at each local workspace computer 114*a-z*, and can be further modified by an analyst 120 and/or the local workspace computer 114*a-z*. More information on local versions of workspace hierarchy factor graphs can be found at least in FIGS. 7-10 and their related discussion below.

Figure 3A:
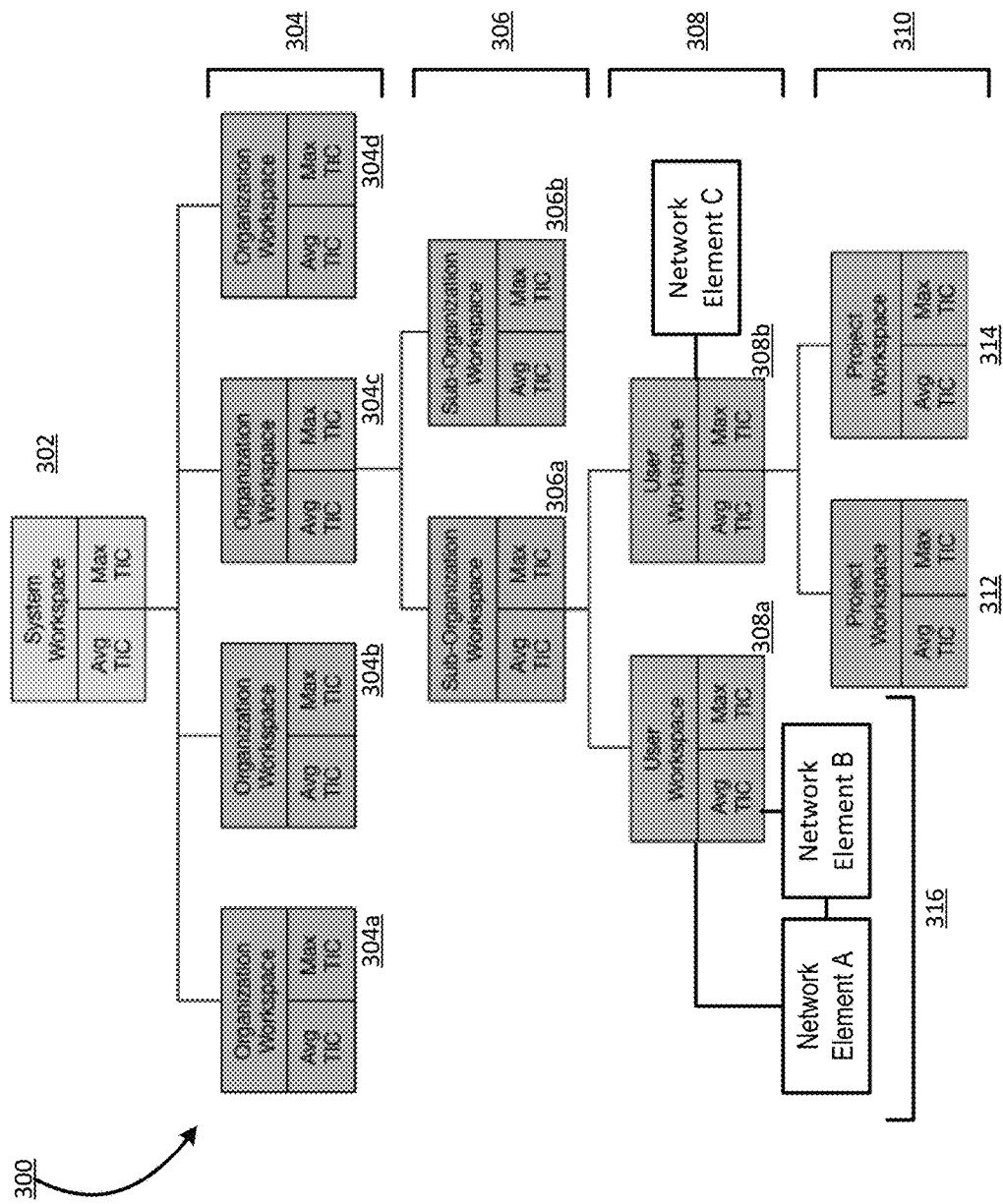
FIGS. 3A-B are diagrams illustrating a workspace hierarchy, according to an embodiment.

FIG. 3A is a diagram illustrating an example workspace hierarchy 300. For example, in some implementations, workspaces can be arranged into hierarchies, where workspaces that fall below other workspaces in the hierarchy can inherit information and/or settings from higher-level workspaces. For example, at the top of the workspace hierarchy 300 can be a system workspace 302 (e.g., a global workspace including information and/or settings that all workspaces in the network share). Workspaces at the organization workspace level 304 can inherit information (including threat data, network element data, rules for calculating threat scores, and/or other information) from the system workspace 302. Similarly, workspaces at the sub-organization workspace level 306 can inherit information from the organization workspaces 304. The same inheritance can occur between the user workspace level 308 and the sub-organization level 306, and the project workspace level 310 and the user workspace level 308. Such information can pertain to scoring parameters used to calculate threat information, network elements associated with the workspace, connections between the network elements, observations of the network elements, an approach to calculating threat information (e.g., using an average or maximum value obtained from higher-level workspaces and/or the network elements to calculate threat data), and/or similar information. Workspaces at lower levels (e.g., at the user workspace level 308) can also store additional information that is not included at workspaces at a higher level (e.g., sub-organization workspace level 306). The workspace hierarchy can indicate whether that additional information should be referenced by and/or relied upon by other workspaces (and which workspaces can inherit the additional information). A data structure representing a workspace hierarchy, as well as data structures associated with each workspace that is included in the workspace hierarchy, can be stored at the factor graph database 110 (e.g., the workspaces being stored in the workspaces table 110b, and the workspace hierarchy being stored in the workspace factor graph table 110c). While the workspace hierarchy herein is described as being implemented as a factor graph, it should be understood that the workspace hierarchy can be implemented as a standard graph data structure, a tree data structure, and/or a similar hierarchical data structure.

In some implementations, a project workspace 312 can inherit information from a user workspace 308b without storing the information at the user workspace 308b. Said another way, while the project workspace 312 can inherit information from the user workspace 308b by referencing data at the user workspace 308b, a workspace record associated with the project workspace 312 may not store any data that is in a workspace record associated with the user workspace 308b. Instead, the workspace record associated with the project workspace 312 can include data that differs from the user workspace 308b, and can reference the data stored at the user workspace 308b, to the extent that the data stored at the user workspace affects data at the project workspace 312. For example, if the user workspace 308b includes a representation of Network Element C, the project workspace 312 can include information indicating the addition of another Network Element F (not shown), and/or can include information indicating the deletion and/or removal of Network Element C from the workspace network 100, but may not include other data about Network Element C. As another example, if the workspace data structure associated with user workspace 308b includes a first set of scoring parameters, the workspace data structure associated with project workspace 312 can include a second set of scoring parameters including parameters from the first set of scoring parameters that have been modified by an analyst 120, and/or a similar entity. The project workspace 312 can also store a threat indicator confidence (TIC) score different from a TIC score of the user workspace 308b, e.g., when the project workspace TIC score differs from the user workspace TIC score by a predetermined amount, and/or based on similar criteria. Similar inheritance mechanisms can exist for each of the user workspace level 308, the sub-organization workspace level 306, and/or the organization workspace level 304. The inheritance of data from higher-level workspaces can be dynamic and automatic. For example, the global workspace management server 102 can automatically propagate changes at higher-level workspaces to lower-level workspaces, such that the global workspace management server 102 can modify lower-level workspaces information based on the changes. Further information relating to TIC scores and how TIC scores are calculated can be found in U.S. patent application Ser. No. 14/562,623 (U.S. Pat. No. 9,210,185), expressly incorporated herein by reference.

As an example, when an analyst 120 and/or other entity retrieves scoring parameters and/or other data, e.g., from a workspace data structure in the factor graph database 110 that is associated with the project workspace 312, the analyst 120 can retrieve a related workspace hierarchy from the factor graph database 110, e.g., based on using a workspace hierarchy identifier stored in the workspace data structure. The analyst 120 can use the workspace hierarchy to determine identifiers associated with higher-level workspaces, can retrieve data from the higher-level workspaces, and can use the data from the higher-level workspaces along with data (also known as delta data) from the project workspace 312 to determine information about the project workspace 312 (e.g., including but not limited to a workspace cyber-threat score). This approach can allow for a compressed representation of workspaces that can reduce the amount of data stored for each workspace in the workspace hierarchy, and therefore can reduce the amount of data transmitted to analysts 120 and/or other entities for processing.

In some implementations, data structures representing each workspace from the plurality of workspaces can include a representation of a set of associated network elements 316, a TIC score calculated in part based on the network elements and/or based on a TIC score of a higher-level workspace and/or set of workspaces, and/or similar information. For example, data structures including information about the network elements 316 can be stored in the network element table 110d of the factor graph database 110, and identifiers of network element records from the network element table 110d can be stored in the data structures of workspaces with which the network elements 316 are associated. When data at a workspace (e.g., project workspace 312) is modified (e.g., at a system workspace level 302), the global workspace management server 102 can generate a new workspace data structure representing a modified project workspace 314, that can include any changes to project workspace 312 that have been made at the system workspace level 302. An analyst 120 can continue to modify project workspace 312 (e.g., modifying elements associated with the project workspace 312, modifying how the project workspace calculates a TIC score, and/or the like). The local workspace manager 116 and/or a local workspace computer 114a-z can receive the modifications and either directly modify the information stored in the workspace data structure of the project workspace 312, and/or can generate a child workspace node (not shown) of the project workspace 312 that includes the modifications to the project workspace 312.

The local workspace manager 116 can also merge the modified portions of project workspace 312 and modified project workspace 314, so as to combine the changes made at the system level with the changes made at the local level. For example, the local workspace manager 116 can include the changes included in modified project workspace 314 in the workspace data structure representing project workspace 312, and then can delete modified project workspace 314. In some implementations, such changes can be provided to the global workspace manager 108 so that the global workspace manager 108 can In this manner, the local workspace manager 116 and/or the local workspace computer 114a-z can store changes to a local workspace (such as project workspace 312) without substantially duplicating other workspace data. In this manner, the workspace hierarchy factor graph can also record changes made to the workspaces by various entities in a compressed manner that can more efficiently be transmitted to and used by other entities in the network.

Figure 3B:
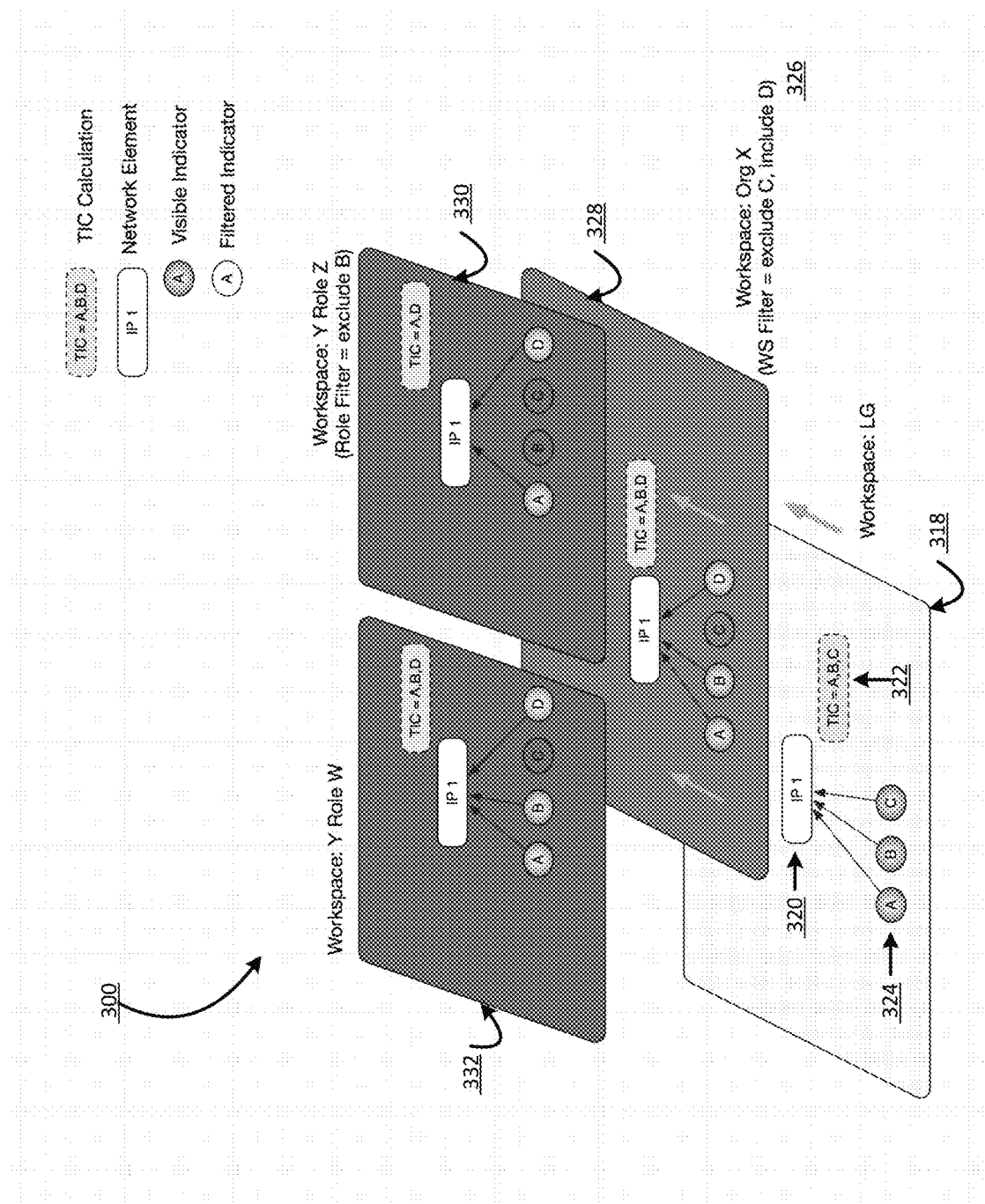

FIG. 3B is a diagram illustrating an additional example workspace hierarchy 300. For example, in some implementations, a workspace (e.g., including but not limited to a system workspace 318) can include data pertaining to network devices 320 associated with the workspace, indicators (e.g., threat intelligence data and/or threat scores such as TIC scores) and/or similar network objects 324, connections between network devices 320 and/or network objects associated with the workspace, a workspace threat score 322 and/or parameters used to calculate the workspace threat score 322, and/or other data. For example, in system workspace 318, a workspace threat score 322 can be calculated based on data relating to network objects A, B, and C; however, in the organization workspace 328, the workspace threat score can be calculated based in data relating to network objects A, B, and D. Thus, each workspace can use different parameters, based on different network devices 320 and/or network objects 324, to calculate a workspace threat score 322 for that workspace.

As noted in FIG. 3B, some portion of the network devices 320, and/or the network objects 324, can be filtered 326 (e.g., may not appear in the data structure of the workspace). Network devices 320 and/or network objects 324 can be filtered when the workspace is inheriting data about the network element 320 and/or network object 324 from a higher-level workspace. For example, data corresponding to network object C can be stored in the data structure for system workspace 318, but may not be stored in the data structure for organization workspace 328, and/or within the data structures for sub-organization workspaces 330 and 332. Instead, organization workspace 328 and sub-organization workspaces 330 and 332 can reference network object C from the system workspace 318.

Figure 4:
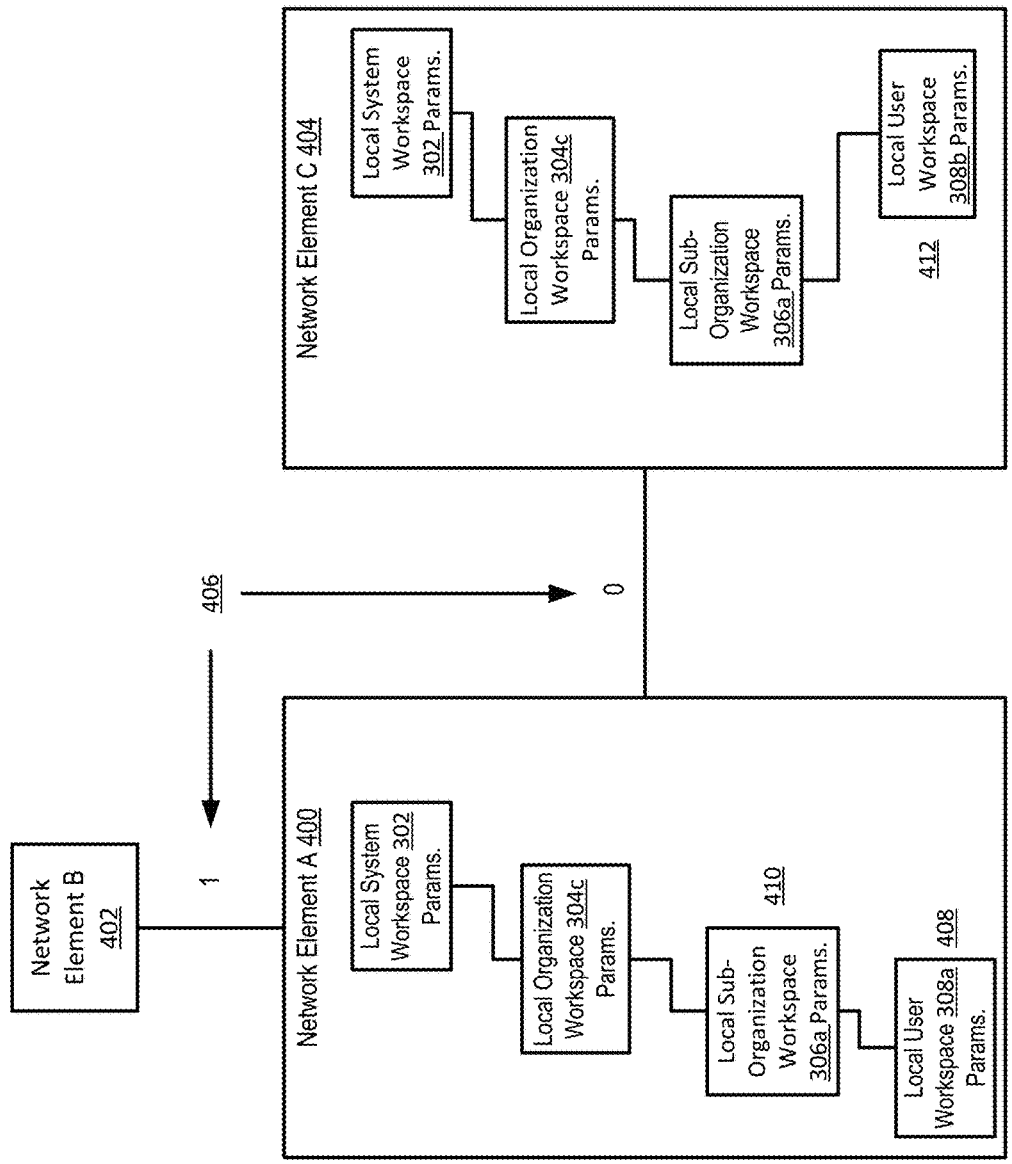
FIG. 4 is a schematic diagram illustrating network elements, according to an embodiment.

FIG. 4 is a schematic diagram illustrating an example of network elements. For example, in some implementations, a network element 400 (e.g., a network computer, network server, and/or similar network elements) can be a network device and/or object that is connected to a number of other network elements (e.g., network element 402 and network element 404) in the workspace network 100. Each network element may be associated with a workspace and/or a set of workspaces, such that workspace data structures representing the workspace and/or set of workspaces include an identifier of that network element. For example, network element 400 can be associated with user workspace 308a, sub-organization workspace 306a, organization workspace 304c, and system workspace 302; network element 404 can be associated with user workspace 308b, sub-organization workspace 306a, organization workspace 304c, and system workspace 302. Thus, for example, a workspace data structure stored in the factor graph database 110 that represents user workspace 308a can include an identifier of network element 400. A workspace data structure stored in the factor graph database 110 that represents sub-organization workspace 306a can also include an identifier of network element 400. An association between a network element and a workspace can indicate that the network element is included in the workspace, affects other network elements in the workspace, and/or otherwise affects the workspace.

Each network element can store parameters associated with the workspaces with which the network element is associated. For example, local user workspace parameters 408 can include threat scores and/or other data stored at a local version of user workspace 308a (e.g., where the local version of user workspace 308a is stored at the local workspace computer 114a). Network element 400 can, at network element 400, store the threat scores and/or other data associated with the user workspace 308a. The network element can also store local sub-organization workspace parameters 410 stored at a local version of sub-organization workspace 306a. The network element 400 can store local parameters for workspaces with which it is associated. In some implementations, a network element can store multiple local workspace parameters. For example, in some implementations, network element 400 can store a first set of local parameters for workspaces, where the first set of local parameters were generated at and/or by local workspace computer 114a. Network element 400 can also store a second set of local parameters for the same workspaces, where the second set of local parameters were generated at and/or by local workspace computer 114b. Thus, each network element can store parameters from one or more local workspace hierarchy factor graphs. In some implementations, network element 400 can also store a representation of the local workspace hierarchy factor graph.

In some implementations, workspace and/or a workspace hierarchy factor graph data structures can include connection values indicating whether or not a network element is associated with a workspace and/or whether the network element is connected to other network elements, and/or to network objects. For example, the workspace hierarchy factor graph can include Boolean values for each workspace, each value specifying whether a particular network element exists at that workspace. As another example, the global workspace management server 102 can store, at the system workspace 302 (e.g., in a workspace data structure associated with the system workspace 302), a list, array, and/or similar data structure including Boolean values for each network element in the workspace network 100, and/or can generate child nodes of the system workspace 302, each representing a different network element. In the latter implementation, a link between the child nodes representing the network elements, and the system workspace 302, can be represented via a Boolean value indicating whether or not the network element is associated with (e.g., exists within) the system workspace 302. In some implementations, a "True" value can indicate that the network element is represented within a workspace, and a "False" value can indicate that the network element does not is represented within the workspace.

The workspace hierarchy factor graph can also include binary values 406 indicating a network element's relationship with other network elements and/or network objects in the workspace network 100. For example, the binary value "1" (e.g., such as that between network element 400 and network element 402) can indicate an active connection between network elements, and a binary value of "0" (e.g., such as that between network element 400 and network element 404) can indicate an inactive and/or non-existent connection between network elements.

Figure 5:
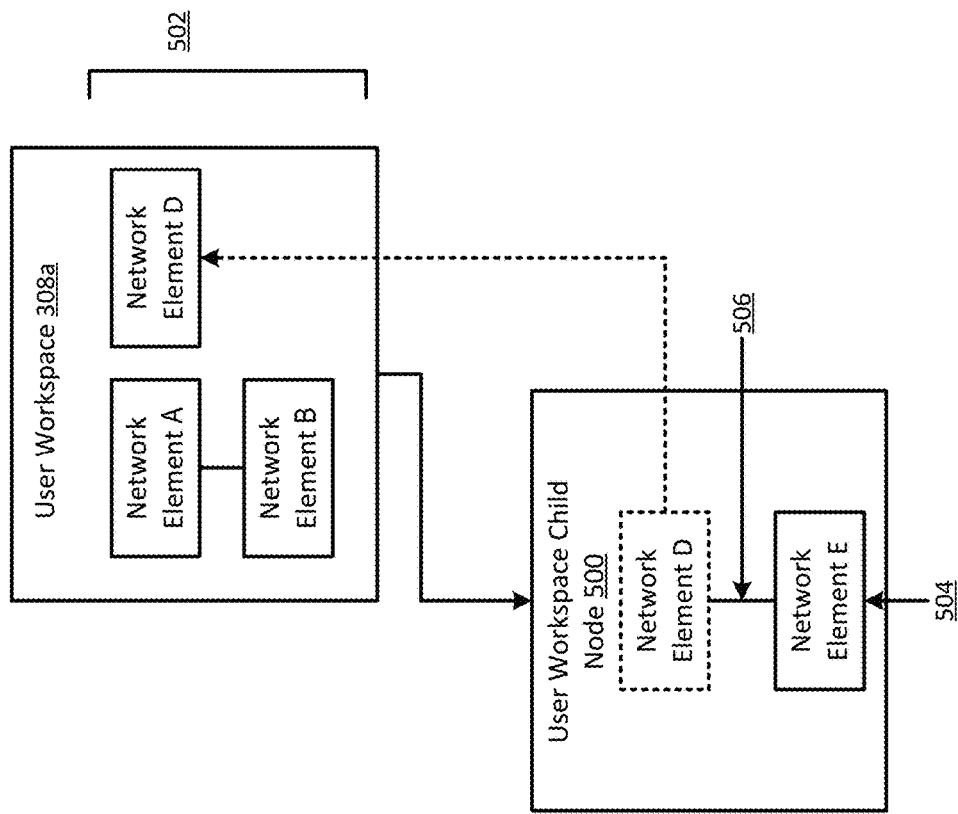
FIG. 5 is a block diagram illustrating workspace child nodes, according to an embodiment.

FIG. 5 is a block diagram illustrating examples of workspace child nodes. For example, a user workspace 308a can be associated with a number of network elements, such as network elements A, B, and D 502. The global workspace management server 102 can (in processes described in more detail herein) generate a user workspace child node 500, e.g., in response to a change being made to the user workspace. For example, if a new network element E 504 (e.g., that has been previously added to the workspace network 100, and/or that is being newly added to the workspace network 100) is added to the user workspace, and if a connection 506 to new network element E 504 and network element D is established within the workspace, the global workspace management server 102 can generate user workspace child node 500 (e.g., a workspace data structure that is a child node of the user workspace 308a). User workspace child node 500 can include information relating to network element E 504 (including but not limited to an identifier of network element F 504), and can also include information relating to the connection 506 between network element E and network element D.

The workspace data structure associated with the user workspace child node 500, however, may not include information relating to network element D, and/or information relating to network elements A or B. The global workspace management server 102 can use the information for network element E 504 (i.e., the information indicating that it is included in the user workspace, and that it has a connection 506 to another network element D for which the user workspace does not have information stored), to infer that additional information about the network element D, and other network elements (i.e., network elements A and B) for which the user workspace does not store information, can be found in at least one higher-level workspace node in the workspace hierarchy factor graph (e.g., such as sub-organization workspace, organization workspace, and/or system workspace). The global workspace management server 102 can therefore use data from other levels of the workspace hierarchy factor graph to determine a complete set of network elements that are included in the user workspace. In some implementations, instead of the user workspace child node storing information representing the connection between the network node D and new network element E 504, the global workspace management server 102 can store information relating to the new network element E 504 at the user workspace child node 500, and can generate an additional user workspace child node (not shown) including an indication of the addition of a connection between new network element E 504 and network element D.

Figure 6:
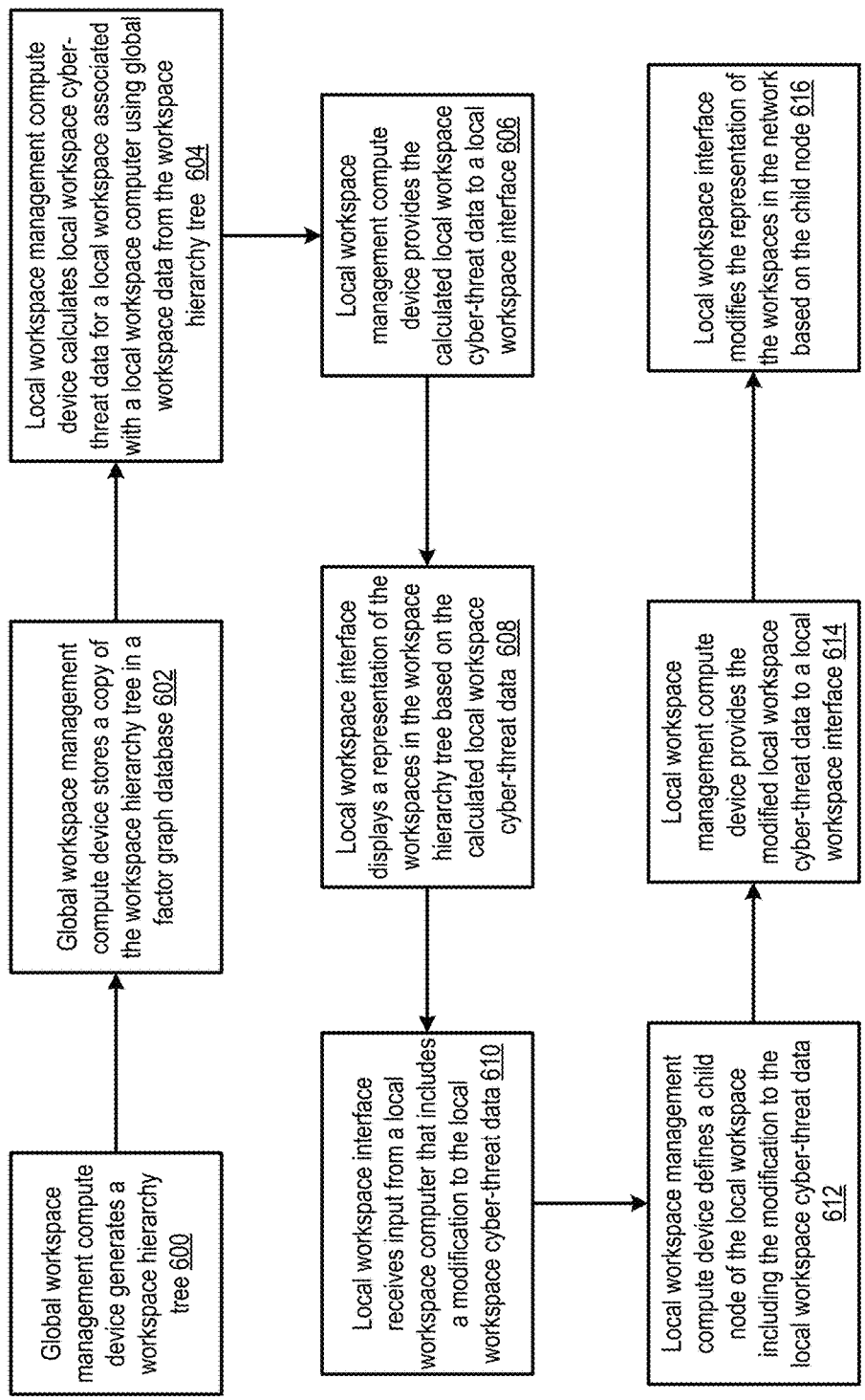
FIG. 6 is a logic flow diagram illustrating displaying a workspace hierarchy tree, according to an embodiment.

FIG. 6 is a logic flow diagram illustrating an example of displaying a workspace hierarchy tree. For example, in some implementations, a global workspace manager 108 can generate at 600 a workspace hierarchy tree. For example, the global workspace manager 108 can arrange a set of workspaces into levels (e.g., a system level, an organization level, a user level, and/or the like), based on which workspaces are likely to inherit data from and/or share similar data with other workspaces, and/or based on other workspace hierarchy conditions. The global workspace manager 108 can specify to which level each workspace is assigned, based on predetermined rules, based on analyst 120 input, and/or based on other factors. The global workspace manager 108 can specify to which level a workspace has been assigned, e.g., by assigning an identifier, tag, and/or other information to each workspace specifying which level the workspace has been assigned, and/or by adding an identifier of the workspace to a node in the workspace hierarchy that corresponds to the workspace.

Workspaces can be assigned to workspace hierarchy levels based on numerous factors. For example, the global workspace manager 108 can specify a workspace as a user workspace if it is likely to be associated with a single analyst 120, and/or if the workspace is likely to include data that is also in an organization workspace. The global workspace manager 108 can specify a workspace as a project workspace if it is likely to be associated with a single analyst 120, and if the workspace is likely to include data that is also in a user workspace associated with the analyst 120. The global workspace manager 108 can specify a workspace as a sub-organization workspace if it is likely to be associated with multiple analysts 120 operating within the same location, interacting with the same network elements, operating within the same branch of an organization, and/or the like, and if the workspace is likely to include data that is also in an organization workspace. The global workspace manager 108 can specify a workspace as an organization workspace if it is likely to be associated with multiple analysts 120 working within different sub-organizations, and if it is likely to include data also included at a system workspace. The global workspace manager 108 can specify a workspace as a system workspace if it is likely to be associated with multiple organizations, and if the data included at that workspace will be included in at least one other workspace in the workspace network 100.

The global workspace manager 108 can use these specifications to generate the workspace hierarchy. Specifically, the global workspace manager 108 can then generate a factor graph, tree, and/or similar data structure that allows the global workspace manager 108 to facilitate inheritance from higher-level workspaces to lower-level workspaces. For example, the global workspace manager 108 can generate the factor graph such that each node of the factor graph and/or similar data structure can represent a workspace (e.g., is an identifier of a workspace, and/or the like), with each edge and/or path between nodes representing a connection between the workspace and other workspaces, network elements, and/or other entities in the workspace network 100. The global workspace manager 108 can add each workspace into the workspace hierarchy, based on its relationship to other workspaces in the workspace network 100 and based on other conditions of the workspace hierarchy as noted above. The global workspace manager 108 can modify workspace locations in the workspace hierarchy by modifying the connections between the workspaces in the workspace hierarchy, until the workspace hierarchy conditions have been met. This process can continue until each workspace in the workspace network 100 has been added to the workspace hierarchy, and until connections between the workspaces in the workspace hierarchy have been modified to ensure that workspace hierarchy conditions have been met.

The global workspace manager 108 can store at 602 a copy of this workspace hierarchy tree in a factor graph database 110. A local workspace manager 116 can calculate at 604 local workspace cyber-threat data for a local workspace associated with a local workspace computer 114a, e.g., using global workspace data from the workspace hierarchy tree. For example, the local workspace manager 116 can calculate workspace cyber-threat data for a local instance of a workspace represented in the workspace hierarchy tree, using workspace data from a system workspace and/or similar global (i.e., top-level) workspace in the workspace hierarchy tree. The local workspace manager 116 can provide at 606 the calculated local workspace cyber-threat data to the local workspace computer 114a. The local workspace computer 114a can then display, via a local workspace interface 118a and at 608, a representation of the workspaces in the workspace hierarchy tree (e.g., using the calculated local workspace cyber-threat data). For example, an analyst 120 working at a local workspace computer 114a and/or similar electronic device can access the local workspace interface 118a at the local workspace computer 114a to view a local version of the workspace hierarchy tree that is stored at the local workspace computer 114a, and that includes the calculated local workspace cyber-threat data.

The local workspace interface 118a can receive at 610 input from the local workspace computer 114a (e.g., directly from the local workspace computer 114a, and/or based on input from the analyst 120) that includes a modification to the local workspace cyber-threat data of a local workspace represented in the local version of the workspace hierarchy tree that is stored at the local workspace computer 114a. For example, the modification can include the addition or deletion of a network element associated with the local workspace, a modification of scoring parameters used to calculate a TIC score, and/or the like. The local workspace interface 118a can send a message and/or a signal to the local workspace manager 116, so that the local workspace manager 116 can define at 612 a child node of the local workspace of the local version of the workspace hierarchy tree local workspace computer 114a, to include the modification to the local workspace cyber-threat data (e.g., as described in FIGS. 3-5). The local workspace manager 116 can then provide at 614 the modified local workspace cyber-threat data (e.g., as a new child node of the local version of the workspace hierarchy tree) to the local workspace computer 114a, such that the modified data can be displayed in the local workspace interface 118a. The local workspace interface 118a can modify (e.g., re-render) at 616 the representation of the workspace in the local version of the workspace hierarchy tree stored at the local workspace computer 114a, based on the new child node defined by the local workspace manager 116.

Figure 7:
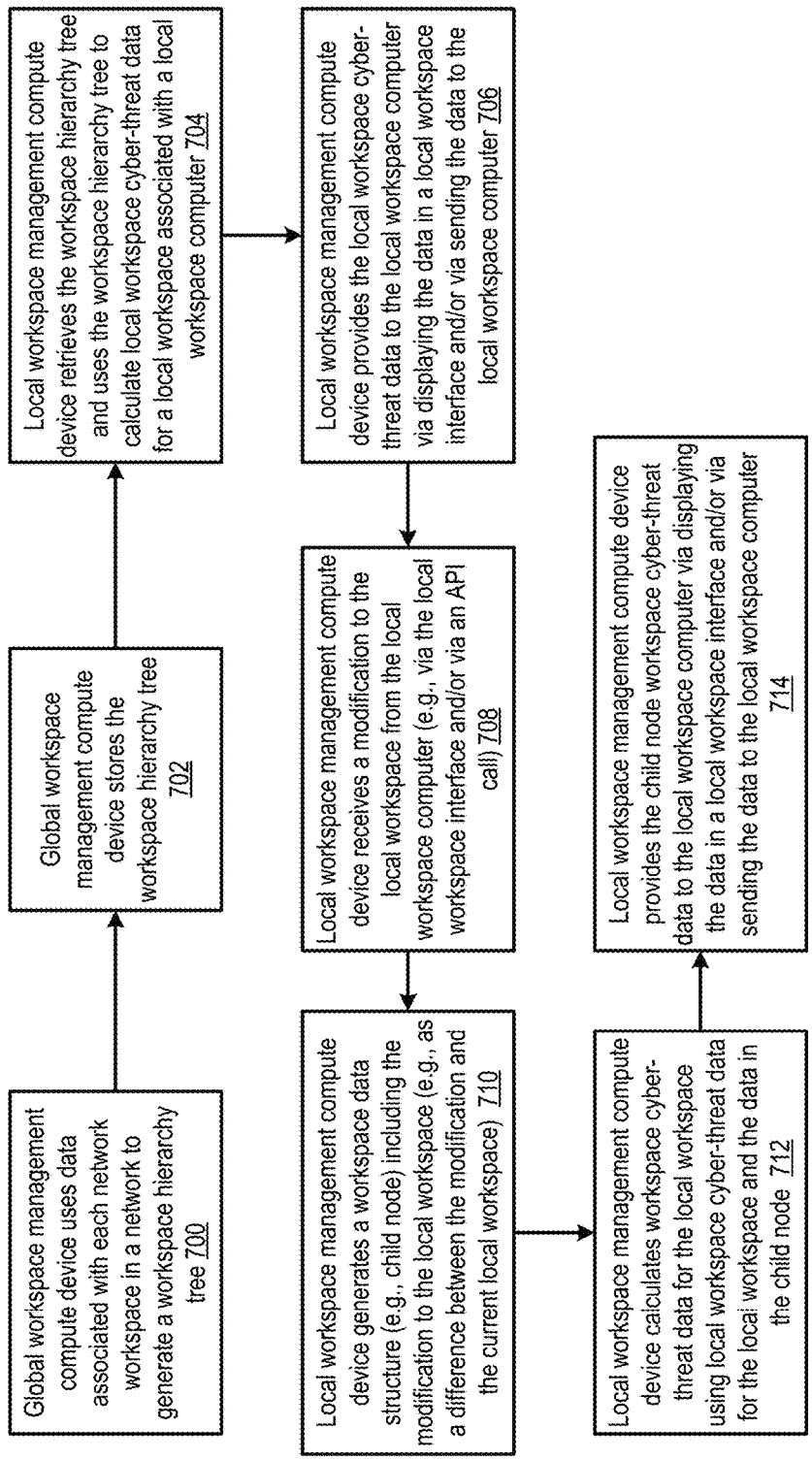
FIG. 7 is logic flow diagram illustrating generating child nodes for display at a local workspace management compute device, according to an embodiment.

FIG. 7 is logic flow diagram illustrating an example of generating child nodes for display at a local workspace manager 116. For example, a global workspace manager 108 can use at 700 data associated with each network workspace in a network to generate a workspace hierarchy tree (e.g., in a manner similar to that described in FIG. 6). The global workspace manager 108 can store at 702 the workspace hierarchy tree in the factor graph database 110. A local workspace management compute device 116 can retrieve at 704 the workspace hierarchy tree and use the workspace hierarchy tree to calculate local workspace cyber-threat data for a local workspace associated with a local workspace computer (i.e., a workspace in a local version of the workspace hierarchy tree that is associated with the local workspace computer 114a). The local workspace manager 116 can provide at 706 the local workspace cyber-threat data to the local workspace computer 114a, e.g., via displaying the data in a local workspace interface 118a instantiated at the local workspace computer 114a, and/or via sending the data directly to the local workspace computer 114a.

The local workspace manager 116 can receive at 708 a modification to the local workspace from the local workspace computer 114a in response to being provided the local workspace manager 116. The local workspace manager 116 can generate at 710, in response to receiving the modification, a workspace data structure (such as a child node, and/or a similar data structure) that includes the modifications being made to the local workspace. The child node can include a difference between the modification and the current local workspace stored locally at local workspace computer 114a, the modification itself, and/or similar information. The local workspace manager 116 can calculate at 712 workspace cyber-threat data for the local workspace associated with the child node, e.g., using local workspace cyber-threat data (e.g., the existing workspace cyber-threat data for the local workspace), and using the data stored in the newly-defined child node (e.g., the modification to the local workspace) to modify the existing workspace cyber-threat data. The local workspace manager 116 can then provide at 714 the child node workspace cyber-threat data to the local workspace computer 114a, e.g., by displaying the child node workspace cyber-threat data in the local workspace interface 118a, and/or by sending the child node workspace cyber-threat data directly to the local workspace computer 114a.

Figure 8:
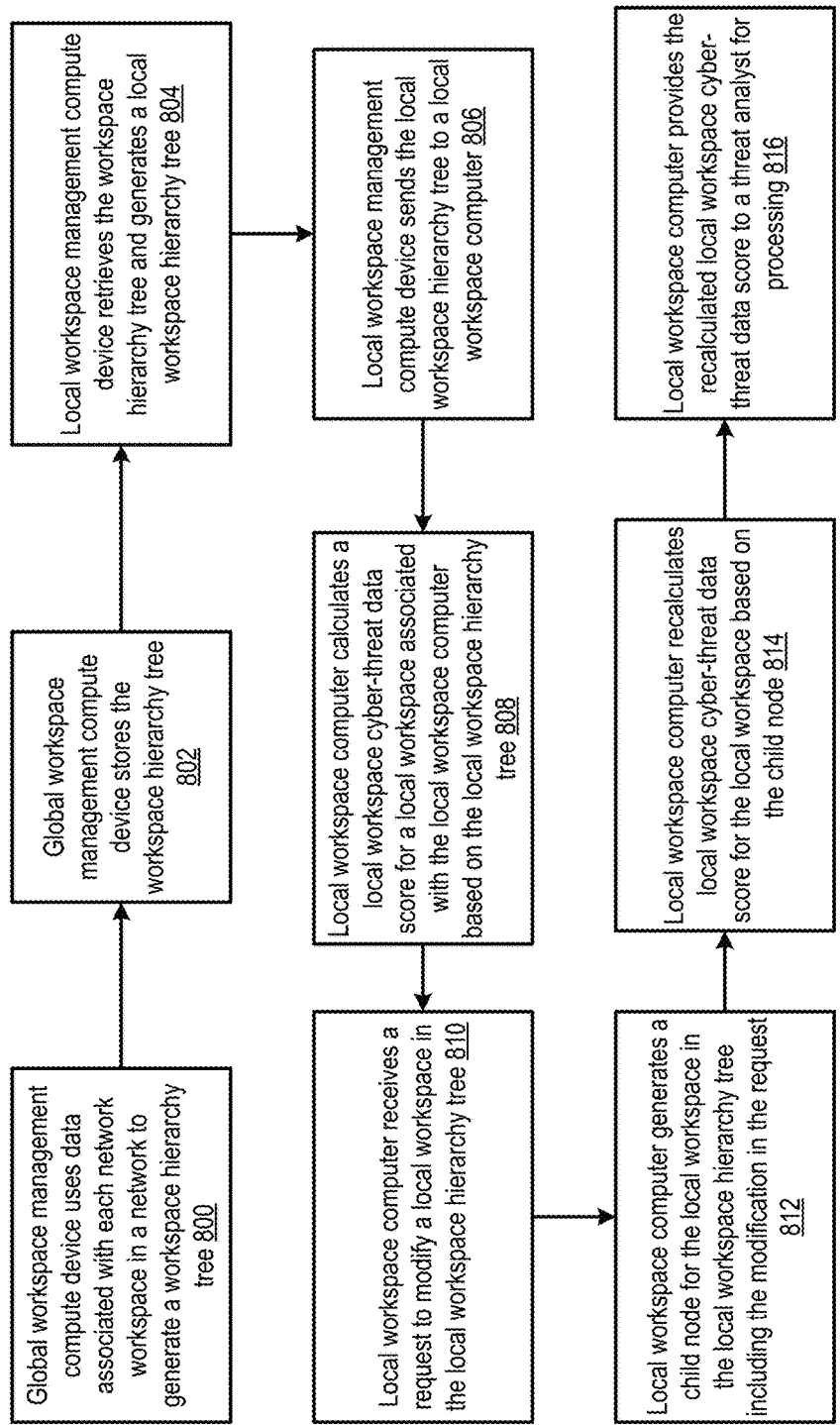
FIG. 8 is logic flow diagram illustrating generating child nodes for display at a local workspace computer, according to an embodiment.

FIG. 8 is logic flow diagram illustrating an example of generating child nodes for display at a local workspace computer 114a. For example, the global workspace manager 108 can use data associated with each network workspace in a network, to generate at 800 a workspace hierarchy tree. For example, the global workspace manager 108 can use a number of network elements associated with a network workspace, and/or other information associated with the network workspace, to generate a workspace hierarchy tree. The global workspace manager 108 can store at 802 the generated workspace hierarchy tree, e.g., in a factor graph database 110. A local workspace manager 116 can retrieve the workspace hierarchy tree from the factor graph database 110, and can generate at 804 a local workspace hierarchy tree, e.g., by generating a duplicate version of the tree for an analyst 120 at a local workspace computer 114a, and/or by generating a null workspace hierarchy tree (e.g., to which child nodes may be added when the analyst 120 modifies the local workspace hierarchy tree). The local workspace manager 116 can send at 806 the local workspace hierarchy tree to a local workspace computer 114a associated with the analyst 120. The local workspace computer 114a can calculate at 808 a local workspace cyber-threat data score for a local workspace associated with the local workspace computer 114a, e.g., based on the local workspace hierarchy tree and cyber-threat data associated with workspaces represented in the local workspace hierarchy tree.

The local workspace computer 114a can receive at 810 (e.g., from the local workspace manager 116, the global workspace manager 108, and/or from another local workspace computer 114b-z) a request (e.g., from an analyst 120 using local workspace computer 114a, from a third-party source, and/or from a similar entity) to modify a local workspace in the local workspace hierarchy tree. The local workspace can be a local workspace associated with the local workspace computer 114a, and/or can be a different local workspace in the local workspace hierarchy tree. The request to modify the local workspace can be a request to modify cyber-threat scoring parameters, a request to add or delete network elements from the local workspace, and/or to make similar modifications, and can be based on changes made to a global workspace, changes made to other local workspaces, and/or based on other similar events. The local workspace computer 114a can generate at 812 a child node of the local workspace that includes the modification specified in the request, and can recalculate at 814 a local workspace cyber-threat data score for the local workspace, e.g., based on the generated child node. The local workspace computer 114a can then provide at 816 the recalculated local workspace cyber-threat data score to a threat analyst 120 for processing. For example, the analyst 120 can use the generated workspace cyber-threat data score to initiate a cyber-threat event, can send the generated workspace cyber-threat data score to other analysts 120 and/or local workspace computers 114b-z such that other analysts 120 modify the calculation of workspace cyber-threat data at their respective local workspaces, and/or can send the generated workspace cyber-threat data to the global workspace manager 108 so as to allow the global workspace manager 108 to modify the global workspace and/or the global workspace hierarchy tree.

Figure 9:
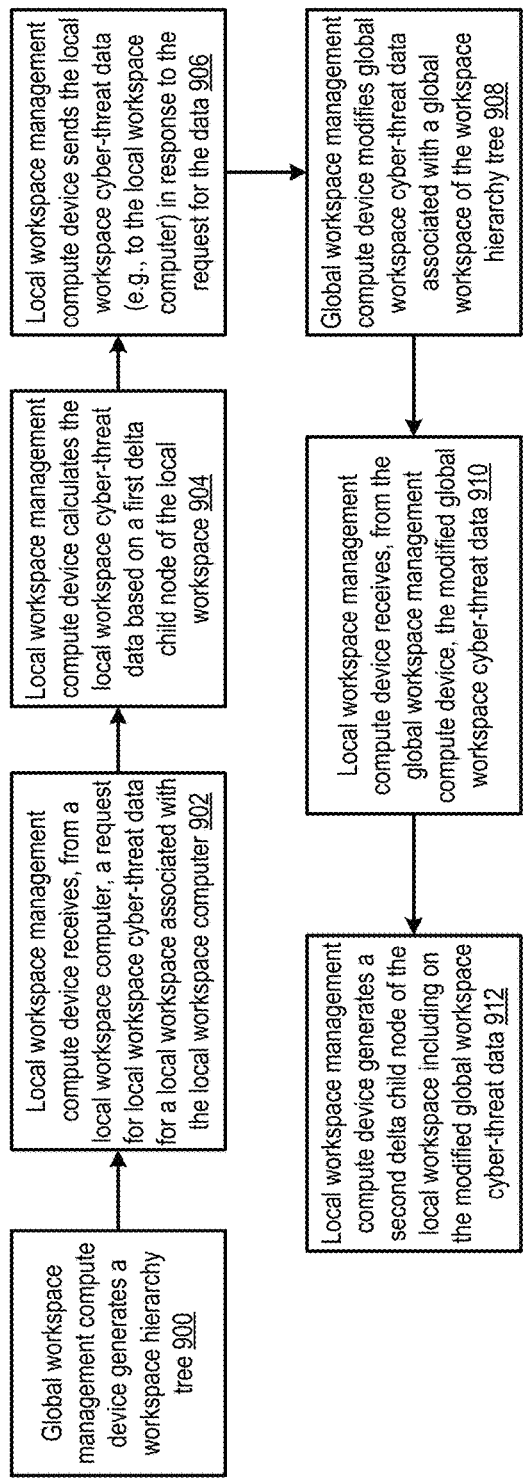
FIG. 9 is logic flow diagram illustrating generating multiple child nodes for a workspace, according to an embodiment.

FIG. 9 is logic flow diagram illustrating an example of generating multiple child nodes for a workspace. For example, in some implementations, a global workspace manager 108 can generate at 900 a workspace hierarchy tree (e.g., in a manner similar to that described in FIGS. 6-8) and can store a copy of the workspace hierarchy tree in the factor graph database 110. A local workspace manager 116 can receive at 902 (e.g., from a local workspace computer) a request for local workspace cyber-threat data for a local workspace associated with the local workspace computer 114a. The local workspace manager 116 can calculate at 904 local workspace cyber-threat data for the local workspace, e.g., based on a first delta child node (e.g., a child node of the local workspace that includes a delta between a current version of the local workspace and a modified version of the local workspace) that has already been defined for the local workspace (e.g., in a manner similar to that described in FIGS. 6-8). The local workspace manager 116 can send at 906 the calculated local workspace cyber-threat data to the local workspace computer 114a, which can then display the data via a local workspace interface 118.

The global workspace manager 108 can, at any point before and/or after the request, modify at 908 global workspace cyber-threat data associated with a global workspace of the workspace hierarchy tree. When the local workspace manager 116 receives at 910 the modified global workspace cyber-threat data from the global workspace manager 108, the local workspace manager 116 can generate at 912 a second delta child node that includes at least some of the modified global workspace cyber-threat data. The second delta child node can also be associated with the local workspace, and can be used in addition to the first delta child node to calculate a workspace cyber-threat data score for the local workspace. The analyst 120 can use the generated workspace cyber-threat data score to further refine global workspace information, to initiate a cyber-threat event, and/or can send the generated workspace cyber-threat data score to other analysts 120 and/or local workspace computers 114b-z so as to modify the calculation of workspace cyber-threat data at local workspace hierarchy trees associated with said other analysts 120 and/or local workspace computers 114b-z. The local workspace manager 116 can generate one or more delta child nodes each time the global workspace cyber-threat data is modified, with each delta child node including at least some of the modified global workspace cyber-threat data. Thus, each local workspace can be associated with an unlimited number of delta child nodes representing numerous changes to the global workspace cyber-threat data.

Figure 10:
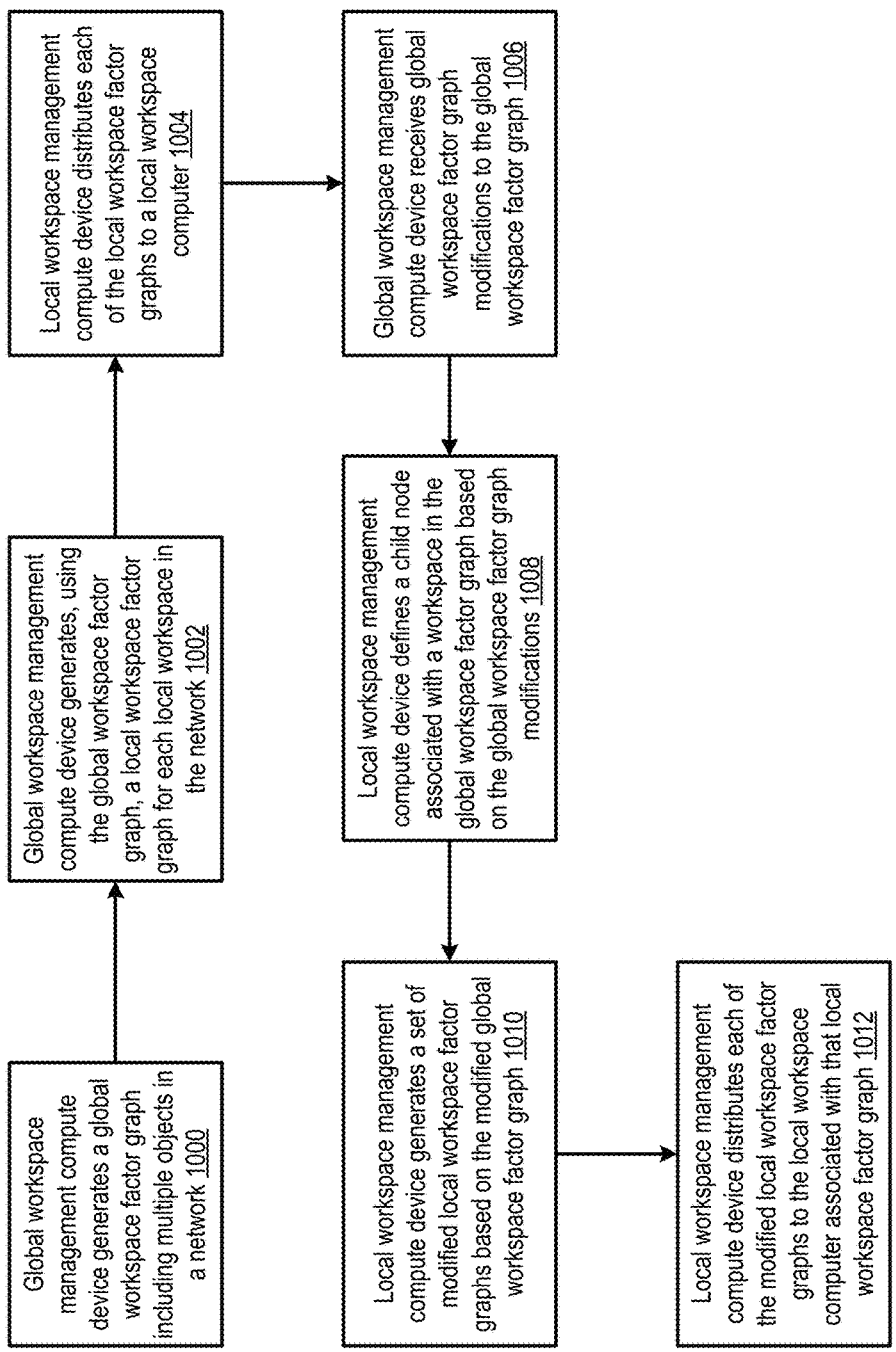
FIG. 10 is logic flow diagram illustrating propagating global workspace modifications, according to an embodiment.

FIG. 10 is logic flow diagram illustrating propagating global workspace modifications. For example, in some implementations, a global workspace manager 108 can generate at 1000 a global workspace factor graph (e.g., a global workspace hierarchy tree implemented via a factor graph) that includes multiple objects and/or network elements in the workspace network 100. The global workspace manager 108 can generate at 1002, using the global workspace factor graph, a local workspace factor graph for each local workspace in the workspace network 100 (e.g., in a manner similar to that described in FIG. 8). A local workspace manager 116 can distribute at 1004 each of the generated local workspace factor graphs to at least one local workspace computer in the workspace network 100.

When the global workspace manager 108 receives at 1006 global workspace factor graph modifications to the global workspace factor graph (e.g., from an analyst 120, from a third-party device, and/or from a different network device), the local workspace manager 116 can use the modifications received by the global workspace manager 108 to define at 1008 a child node for at least one workspace in the global workspace factor graph. The global workspace manager 108 can determine the at least one workspace to modify based on information identifying the relevant workspaces in the global workspace factor graph modifications, and/or based on identifying information in a request that includes the global workspace factor graph modifications. In some implementations, the local workspace manager 116 can generate at 1010 a set of modified local workspace factor graphs for each analyst 120, based on the global workspace factor graph modifications. In other implementations, the local workspace manager 116 can generate a set of modifications that each local workspace computer 114a-z can perform on its respective local workspace factor graph, e.g., to update that local workspace factor graph. Said another way, in other implementations, the local workspace manager 116 can generate a set of modified local workspace factor graphs for each analyst 120 associated with a workspace that is affected by the global workspace factor graph modifications, and may not generate a set of modified local workspace factor graphs for analysts 120 associated with a workspace that is not affected by the global workspace factor graph modifications, and/or that is not substantially affected by the global workspace factor graph modifications (i.e., the global workspace factor graph modifications do not change cyber-threat data, TIC scores, and/or other information calculated at the workspace beyond a predetermined threshold, and/or the like).

The local workspace manager 116 can then distribute at 1012 each of the modified local workspace factor graphs, and/or the local workspace factor graph modifications, to the local workspace computer(s) 114a-z associated with that local workspace factor graph. The local workspace computer(s) 114a-z can use the data distributed from the local workspace manager 116 to modify and/or replace a local workspace factor graph at that local workspace computer. That local workspace computer can also recalculate workspace cyber-threat data scores, TIC scores, and/or other data, in response to receiving a modified local workspace factor graph, and/or receiving modifications to the local workspace factor graph.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. A system, comprising:
a global workspace management compute device, including a processor and a memory that generates a workspace hierarchy tree (1) representing a hierarchy of a plurality of workspaces in a network and (2) including a representation of a global workspace;
a local workspace management compute device, operatively coupled to the global workspace management compute device, that, during operation, retrieves the workspace hierarchy tree, and calculates local workspace cyber-threat data for a local workspace from the plurality of workspaces and instantiated at the local workspace management compute device, the local workspace cyber-threat data calculated based on global workspace cyber-threat data of the retrieved workspace hierarchy tree and associated with the global workspace, each of the local workspace cyber-threat data and the global workspace cyber-threat data representing at least one risk to a device in the network; and
a local workspace interface, operatively coupled to the local workspace management compute device, that displays a representation of the plurality of workspaces in the network based on the local workspace cyber-threat data associated with the local workspace,
wherein, during operation:
the local workspace management compute device receives input from a local workspace administrator, via an application programming interface (API) call, the input including a modification to the local workspace cyber-threat data associated with the local workspace,
the local workspace management compute device defines a child node of a node representing the local workspace in the representation of the plurality of workspaces in the network based on the input including the modification to the local workspace cyber-threat data associated with the local workspace;
the local workspace management compute device generates a recalculated local workspace cyber-threat data score based on data of the child node;
the local workspace interface modifies the representation of the plurality of workspaces in the network based on the recalculated local workspace cyber-threat data score, to generate a modified representation of the plurality of workspaces in the network, the modified representation of the plurality of workspaces in the network including the recalculated local workspace cyber-threat data score and a representation of a set of network elements in the network;
the local workspace interface displays the modified representation of the plurality of workspaces in the network;
the local workspace management compute device sends the recalculated local workspace cyber-threat data score to the global workspace management compute device causing the global workspace management compute device to recalculate the global workspace cyber-threat data score based on the recalculated local workspace cyber-threat data score in the workspace hierarchy tree and the representation of the global workspace; and
the global workspace management compute device automatically updates the representation of the plurality of workspaces in the network including corresponding local workspace cyber-threat data scores based on modifications to the representation of the global workspace including the recalculated global workspace cyber-threat data score and propagates the updated representations to affected local workspaces via the local workspace management compute device.

2. The system of claim 1, wherein:
the child node includes modified local workspace cyber-threat data, and
the modified local workspace cyber-threat data is represented by a difference between the local workspace cyber-threat data and the input from the local workspace administrator.

3. The system of claim 1, wherein the local workspace cyber-threat data includes an influence factor for an object associated with the local workspace.

4. The system of claim 1, wherein, during operation:
the local workspace management compute device detects a second modification of the local workspace,
the local workspace management compute device defines at least one additional child node of the node representing the local workspace in the representation of the plurality of workspaces in the network based on the second modification of the local workspace.

5. The system of claim 1, wherein:
the local workspace is a first local workspace, and
during operation:
the local workspace management compute device determines modified local workspace cyber-threat data for a second local workspace from the plurality of workspaces and associated with the first local workspace based on the modification to the local workspace cyber-threat data associated with the first local workspace; and the local workspace interface modifies the representation of the plurality of workspaces in the network based on the modified local workspace cyber-threat data for the second local workspace and an influence factor of the first local workspace.

6. The system of claim 1, wherein:
the child node is a first child node;
the local workspace management compute device defines a second child node of the node representing the local workspace in the representation of the plurality of workspaces in the network based on a subsequent modification to the local workspace cyber-threat data associated with the local workspace; and
local workspace cyber-threat data included in each of the first child node and the second child node includes a threat indicator confidence score.

7. The system of claim 1, wherein the child node is defined when a difference between the local workspace cyber-threat data of the local workspace and the modification of the local workspace cyber-threat data of the local workspace exceeds a predetermined limit.

8. The system of claim 1, wherein the workspace hierarchy tree and child nodes associated with each workspace in the workspace hierarchy tree are implemented as a distributed factor graph.

9. The system of claim 1, wherein the modification of the representation of the plurality of workspaces in the network is further based on a modification of the global workspace cyber-threat data associated with the global workspace.

10. The system of claim 1, wherein the child node includes a threat score, the system further comprising:
a threat score calculator that, during operation, calculates a threat score of the local workspace and a threat score of the first child node based on the threat score of the local workspace, and
wherein the global workspace management compute device, during operation, stores the threat score of the child node when a difference between the threat score of the local workspace and the threat score of the child node exceeds a predetermined limit.

11. The system of claim 1, wherein the workspace hierarchy tree represents the hierarchy of the plurality of workspaces in a compressed form, such that an amount of data transmitted to analysts is reduced.

12. The system of claim 1, the local workspace management compute device receives a request to modify cyber-threat scoring parameters, the defining the child node further based on the request to modify cyber-threat scoring parameters.

13. The system of claim 1, wherein the modified representation of the plurality of workspaces in the network further includes at least one of:
threat information associated with a particular analyst;
threat information associated with an organization;
data relating to the organization;
data relating to a member of the organization; or
data indicating a last time the workspace data was updated.

14. A method, comprising:
receiving, at a first compute device and from a second compute device, a workspace hierarchy tree generated by the second compute device, the workspace hierarchy tree (1) representing a hierarchy of a plurality of workspaces in a network and (2) including a representation of a global workspace;
calculating, at the first compute device, local workspace cyber-threat data for a local workspace from the plurality of workspaces and instantiated at the first compute device, the local workspace cyber-threat data calculated based on global workspace cyber-threat data of the workspace hierarchy tree and associated with the global workspace, each of the local workspace cyber-threat data and the global workspace cyber-threat data representing at least one risk to a device in the network;
displaying, at a local interface operatively coupled to the first compute device, a representation of the plurality of workspaces in the network based on the local workspace cyber-threat data associated with the local workspace;
receiving, at the first compute device, input from a local workspace administrator, via an application programming interface (API) call, the input including a modification to the local workspace cyber-threat data associated with the local workspace;
defining, at the first compute device, a child node of a node representing the local workspace in the representation of the plurality of workspaces in the network based on the input including the modification to the local workspace cyber-threat data associated with the local workspace;
generating, at the first compute device, a recalculated local workspace cyber-threat data score based on data of the child node;
modifying, at the local workspace interface, the representation of the plurality of workspaces in the network based on the recalculated local workspace cyber-threat data score, and generating a modified representation of the plurality of workspaces in the network, the modified representation of the plurality of workspaces in the network including the recalculated local workspace cyber-threat data score and a representation of a set of network elements of the network;
displaying, via the local workspace interface, the modified representation of the plurality of workspaces in the network;
sending the recalculated local workspace cyber-threat data score from the first compute device to the second compute device, causing the second compute device to recalculate the global workspace cyber-threat data score based on the recalculated local workspace cyber-threat data score in the workspace hierarchy tree and the representation of the global workspace;
automatically updating, by the second computing device, the representation of the plurality of workspaces in the network including corresponding local workspace cyber-threat data scores based on modifications to the representation of the global workspace including the recalculated global workspace cyber-threat data score; and
propagating, by the second compute device, the updated representations to affected local workspaces via the first compute device.

15. The method of claim 14, wherein:
the child node includes modified local workspace cyber-threat data, and
the modified local workspace cyber-threat data is represented by a difference between the local workspace cyber-threat data and the input from the local workspace administrator.

16. The method of claim 14, wherein the local workspace cyber-threat data includes an influence factor for an object associated with the local workspace.

17. The method of claim 14, further comprising:
  detecting, via the first compute device, a second modification of the local workspace, and
  defining, at the first compute device, at least one additional child node of the node representing the local workspace in the representation of the plurality of workspaces in the network based on the second modification of the local workspace.

18. The method of claim 14, wherein the local workspace is a first local workspace from the plurality of workspaces, the method further comprising:
  determining, via the first compute device, modified local workspace cyber-threat data for a second local workspace from the plurality of workspaces and associated with the first local workspace based on the modification to the local workspace cyber-threat data associated with the first local workspace; and
  modifying, via the local workspace interface, the representation of the plurality of workspaces in the network based on the modified local workspace cyber-threat data for the second local workspace and an influence factor of the first local workspace.

19. The method of claim 14, wherein the child node is a first child node, the method further comprising defining, via the first compute device, a second child node of the node representing the local workspace in the representation of the plurality of workspaces in the network based on a subsequent modification to the local workspace cyber-threat data associated with the local workspace, local workspace cyber-threat data included in each of the first child node and the second child node including a threat indicator confidence score.

20. The method of claim 14, wherein the defining the child node is performed in response to detecting that a difference between the local workspace cyber-threat data of the local workspace and the modification of the local workspace cyber-threat data of the local workspace exceeds a predetermined limit.

21. The method of claim 14, wherein the workspace hierarchy tree includes a distributed factor graph.

22. The method of claim 14, wherein the modifying the representation of the plurality of workspaces in the network is further based on a modification of the global workspace cyber-threat data associated with the global workspace.

23. The method of claim 14, wherein the child node includes a threat score, the method further comprising:
  calculating, via a threat score calculator, a threat score of the local workspace, and a threat score of the first child node based on the threat score of the local workspace, and
  storing, via the second compute device, the threat score of the child node when a difference between the threat score of the local workspace and the threat score of the child node exceeds a predetermined limit.

24. The method of claim 14, wherein the workspace hierarchy tree represents the hierarchy of the plurality of workspaces in a compressed form, such that an amount of data transmitted to analysts is reduced.

25. The method of claim 14, further comprising receiving, at the first compute device, a request to modify cyber-threat scoring parameters, the defining the child node further based on the request to modify cyber-threat scoring parameters.

26. The method of claim 14, wherein the modified representation of the plurality of workspaces in the network further includes at least one of:
  threat information associated with a particular analyst;
  threat information associated with an organization;
  data relating to the organization;
  data relating to a member of the organization; or
  data indicating a last time the workspace data was updated.

\* \* \* \* \*